(12) United States Patent
Shahid et al.

(10) Patent No.: US 11,595,890 B2
(45) Date of Patent: Feb. 28, 2023

(54) CONNECTED MODE DISCONTINUOUS RECEPTION ENABLEMENT AND PARAMETER ADAPTATION

(71) Applicant: T-Mobile USA, Inc., Bellevue, WA (US)

(72) Inventors: Wafik Abdel Shahid, Kenmore, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 83 days.

(21) Appl. No.: 17/122,312

(22) Filed: Dec. 15, 2020

(65) Prior Publication Data

US 2022/0191787 A1  Jun. 16, 2022

(51) Int. Cl.
*H04W 52/02* (2009.01)
*H04B 17/318* (2015.01)
(Continued)

(52) U.S. Cl.
CPC ........ *H04W 52/0212* (2013.01); *G06N 20/00* (2019.01); *H04B 17/318* (2015.01); *H04L 43/0811* (2013.01); *H04L 47/24* (2013.01); *H04W 52/0261* (2013.01); *H04W 76/28* (2018.02)

(58) Field of Classification Search
CPC ........... G06N 3/02; G06N 3/08; G06N 7/023; G06N 20/00; H04B 17/318; H04L 41/16; H04L 25/0254; H04L 25/03165; H04L 43/0811; H04L 47/24; H04L 2012/5686; H04L 2025/03554; H04W 52/00; H04W 52/02; H04W 52/0203; H04W 52/0212; H04W 52/0225; H04W 52/0229;
(Continued)

(56) References Cited

U.S. PATENT DOCUMENTS 10,285,028 B2   5/2019  Chincholi et al.
2015/0365995 A1* 12/2015 Tabet ................... H04W 76/28
                                                                370/311
(Continued)

OTHER PUBLICATIONS

Shin et al., Artificial Intelligence-Based Discontinuous Reception for Energy Saving in 5G Networks, MDPI, 19 pages, Jul. 11, 2019.*
(Continued)

*Primary Examiner* — Frank Duong
(74) *Attorney, Agent, or Firm* — Lee & Hayes, P.C.

(57) ABSTRACT

Techniques for dynamically adjusting Connected Mode Discontinuous Reception (CDRX) parameters are discussed herein. For example, a base station may receive information associated with downlink data to be sent to a user equipment (UE) and/or information associated with the UE itself. The base station may adjust CDRX parameters to be implemented on the UE based on the received information in order to maximize performance of the UE. In some examples, the base station may adjust CDRX parameters based on a traffic type (e.g., voice traffic, video traffic, data traffic, etc.) associated with the downlink data, UE state parameters associated with the UE, and/or Received Signal Strength Indicator (RSSI) data associated with the UE.

20 Claims, 7 Drawing Sheets

(51) Int. Cl.
*H04W 76/28* (2018.01)
*G06N 20/00* (2019.01)
*H04L 43/0811* (2022.01)
*H04L 47/24* (2022.01)

(58) Field of Classification Search
CPC ......... H04W 52/0235; H04W 52/0261; H04W 52/0277; H04W 76/28; H04W 84/12
See application file for complete search history.

(56) References Cited

U.S. PATENT DOCUMENTS

| | | | |
|---|---|---|---|
| 2017/0019820 A1* | 1/2017 | Das | H04W 76/28 |
| 2017/0318536 A1* | 11/2017 | Manepalli | H04W 24/02 |
| 2018/0227856 A1 | 8/2018 | Yang et al. | |
| 2018/0343686 A1 | 11/2018 | Manepalli et al. | |
| 2020/0205062 A1 | 6/2020 | Azizi et al. | |
| 2020/0245395 A1* | 7/2020 | Zhang | H04L 5/0053 |
| 2020/0267655 A1* | 8/2020 | Awoniyi-Oteri | H04W 52/0235 |
| 2020/0367171 A1 | 11/2020 | Tsai et al. | |

OTHER PUBLICATIONS

Laselva et al., Deliverable D3.2, Recommended Multi-Service Performance Optimization Solutions for Improved E2E Performance, one5G, 150 pages, May 31, 2019.*
Corcoran et al., Data Driven Selection of DRX for Energy Efficient 5G RAN, DiVA, 10 pages, 2017.*
Corcoran et al., "Data Driven Selection of DRX for Energy Efficient 5G RAN", 2017 13th Intl Conf on Network and Service Management, Nov. 2017, 9 pgs.
Ericsson Blog, "A Technical Look at 5G Mobile Device Energy Efficiency", retrieved Dec. 15, 2020 at https://www.ericsson.com/en/blog/2020/2/mobile-devices-and-energy-efficiency, 9 pgs.
Extended European Search Report dated Apr. 14, 2022 for European Patent No. 21210574.6, 9 pages.
Memom et al., Artificial Intelligence-Based Discontinuous Reception for Energy Saving in 5G Networks, MDPI, Electronics 2019, 8 (7), Jul. 11, 2019, 19 pgs.

* cited by examiner

CONNECTED MODE DISCONTINUOUS RECEPTION ENABLEMENT AND PARAMETER ADAPTATION

BACKGROUND

User equipment (UEs) connected to a telecommunications network (also referred to as "the network") are required to listen for data from the network even when there is no traffic between the UE and the network. In order to save battery consumption, the network may implement Connected Mode Discontinuous Reception (CDRX) parameters on the UE to coordinate time periods for the UE to be connected to the network for receiving data and for the UE to be in a sleep mode. Determining proper CDRX parameters for the UE conserves power while ensuring the UE receives data from the network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for determining CDRX parameters to apply to a UE are discussed herein. For example, data (e.g., downlink data) received at a base station may include a particular type of traffic classification. The base station may select CDRX parameters based on the traffic classification of the data in order to maximize performance of the UE (e.g., conserver power) while ensuring that the UE is awake when data is being transmitted from the base station. The base station may send the CDRX parameters to the UE and send the data to the UE based on the CDRX parameters. In some cases, the base station may determine the CDRX parameters based on other types of information, such as UE state data received by the base station, Received Signal Strength Indicator (RSSI) data associated with the UE, a size of the data being sent to the UE, a congestion level associated with the base station, etc.

Conventional operation selects CDRX parameters at the start of a call session without consideration of the type of traffic associated with downlink data, UE state data, RSSI data, data size, or congestion level. CDRX parameters that may be optimal for a first UE receiving a first type of data may not be optimal for a second UE receiving a second type of data. Additionally, CDRX parameters are often sent via Radio Resource Control (RRC) reconfiguration messages that can cause an ongoing call to be dropped when received.

By dynamically adapting CDRX parameters for a UE based on the type of traffic included in downlink data (as well as other types of data), the UE may conserve power by efficiently adjusting sleep cycles and being connected with the base station. For example, a base station may receive downlink data from a computing device that is intended to be transmitted to a UE. The downlink data can include data stored in a transmit buffer associated with the base station. In some examples, the downlink data can represent an amount of data to be transmitted to a UE in a next transmission time interval (TTI) associated with an LTE connection and/or a 5G connection. In some examples, the downlink data can include metadata such as a type of data (e.g., voice, video, data, gaming, TCP, UDP, etc.).

In some cases, the base station may determine a traffic classification associated with the downlink data. For example, the base station may determine that the downlink data is associated with at least one of voice traffic, video traffic, data traffic, etc. Once the traffic classification is determined, the base station may determine CDRX parameters that should be applied to the UE based on the traffic classification. For example, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc. The base station may adjust any of and/or all of the CDRX parameters based on the traffic classification of the downlink data in order to improve the efficiency (e.g., to conserve power) of the UE.

In some examples, the base station may determine CDRX parameters based on other types of information, such as but not limited to, UE state data received from the UE, RSSI data associated with the UE, a size of the downlink data, and/or a congestion level associated with the base station. In some cases, the UE state data may include an indication that the UE is associated with a low power mode, an amount of power in a battery associated with the UE, a charge state indication associated with the UE, an application associated with the UE, and/or a temperature associated with the UE.

In some examples, a machine learned model can determine traffic classification parameters such as packet frequency data and/or packet size data. In some examples, a traffic classification can be based on a data source or destination, analyzing traffic patterns over time, deep packet inspection, application(s) operating on a UE, radio frequency conditions, UE state, UE location, etc., in addition to other data, conditions, or parameters discussed herein.

Once the CDRX parameters are determined, the base station may send the CDRX parameters to the UE. For example, the base station may utilize a media access control (MAC) layer of the base station to communicate with a MAC layer of the UE and provide the CDRX parameters. By utilizing the MAC layer to provide the CDRX parameters, the base station may update CDRX parameters more frequently without having to send an RRC message to the UE, thereby decreasing the potential for dropped calls. In some examples, once the CDRX parameters are sent to the UE and the UE is operating in accordance with the CDRX parameters, the base station may send the downlink data to the UE.

In some examples, the techniques discussed herein can be implemented in the context of protocols associated with one or more of 3G, 4G, 4G LTE, 5G protocols. In some examples, the network implementations can support stand-alone architectures, non-standalone architectures, dual connectivity, carrier aggregation, etc.

For example, CDRX parameters can be enabled and/or determined based on an availability of different radio access technologies (RATs) such as 4G and 5G. A first set of CDRX parameters may be determined for a 4G air interface and a second set of CDRX parameters may be determined for a 5G air interface. In some examples, such as when using carrier aggregation, a first set of CDRX parameters can be determined for a first set of frequency resources (e.g., low-band, ~600 MHz) and a second set of CDRX parameters can be determined for a second set of frequency resources (e.g., mid band (~2.5 GHz) or high band (mmWave)). In some examples, downlink data can be routed to various air interfaces or to use certain frequencies based on the CDRX parameters associated with the various resources.

For example, voice data can be routed through low-band frequency resources, where the CDRX parameters are optimized for voice traffic, while non-voice data can be routed through mid-band frequency resources, where the CDRX parameters are optimized for data traffic. This is just one example implementation and other examples are discussed throughout this disclosure. Example implementations are provided below with reference to the following figures.

Figure 1:
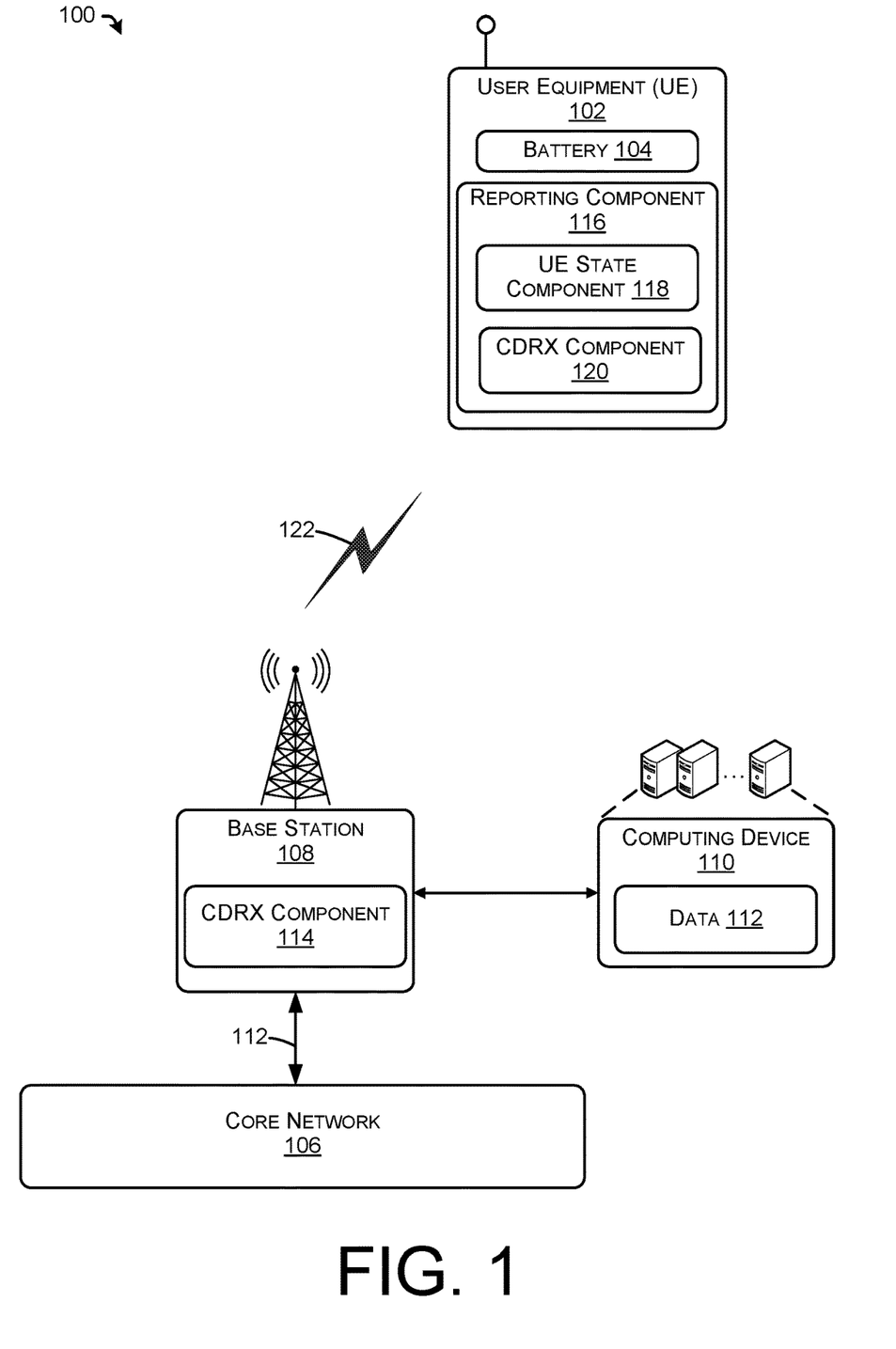
FIG. 1 shows an example network environment in which a UE can adjust CDRX parameters in a telecommunication network.

FIG. 1 shows an example network environment 100 in which a UE 102 can connect to a telecommunication network to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The UE 102 can include a battery 104 that stores energy used to power the functions of the UE 102. The battery 104 can be a lithium-ion (Li-ion) battery, a lithium-ion polymer (LiPo) battery, a nickel cadmium (NiCad) battery, a nickel-metal hydride (NiMH) battery, or other type of battery. In some examples, the battery 104 can be rechargeable. For instance, the energy level of the battery 104 can increase when the UE 102 is connected to a wall outlet, a portable charger, or another external power source. However, operations of the UE 102 can also use energy and thus drain the battery 104 when the battery 104 is not charging.

The telecommunication network can have one or more access networks that include base stations and/or other access points, as well as a core network 106 linked to the access network. The access networks and/or the core network 106 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to one or more base stations or other access points of the access networks, and in turn be connected to the core network 106 via the base stations or other access points. In some examples, the core network 106 can be a packet core network of an LTE network, which may be referred to as an Evolved Packet Core (EPC). In other examples, the core network 106 can be a 5G core network.

The access networks can include a base station 108 that communicates with the UE 102, the core network 106, and a computing device 110, as well as other UEs and other base stations not illustrated in FIG. 1. In some cases, the base station 108 may be associated with an LTE access network known as an Evolved UMTS Terrestrial Radio Access Network (E-UTRAN). Base stations of the LTE access network can be known as eNBs. In some cases, the base station 108 may be associated with a 5G access network with base stations known as gNBs.

The base station 108 can be connected to the core network 106. For example, the base station 108 may be connected to the core network 106 via S1 interfaces, or other interfaces, for transmission of user plane data and/or control plane data. The base station 108 may also be connected to other base stations over an X2 interface, or other interface, for transmission of user plane data and/or control plane data.

In some examples, the base station 108 may receive downlink data 112 from the computing device 110 and/or the core network 106 that is intended to be transmitted to the UE 102. The downlink data 112 can include data stored in a transmit buffer associated with the base station 108. In some examples, the downlink data 112 can represent an amount of data to be transmitted to the UE 102 in a next transmission time interval (TTI) associated with an LTE connection and/or a 5G connection. In some examples, the downlink data 112 can include metadata such as a type of data (e.g., voice, video, data, gaming, TCP, UDP, etc.).

In some cases, the base station 108 may determine a traffic classification associated with the downlink data 112. For example, the base station 108 may determine that the downlink data 112 is associated with at least one of voice traffic, video traffic, data traffic, etc. Once the traffic classification is determined, a CDRX component 114 of the base station 108 may determine CDRX parameters that should be applied to the UE 102 based on the traffic classification. For example, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc. The CDRX component 114 of the base station 108 may adjust any of and/or all of the CDRX parameters based on the traffic classification of the downlink data 112 in order to improve the efficiency (e.g., to conserve power) of the UE 102.

In some examples, the CDRX component 114 of the base station 108 may determine CDRX parameters based on other types of information, such as but not limited to, UE state data received from a reporting component 116 that reports data from a UE state component 118, radio frequency condition data such as RSSI data associated with the UE 102 or encoding schemes (e.g., QAM levels), data bearer types, guaranteed bit rates, a size of the downlink data 112, and/or a congestion level associated with the base station 108. In some cases, the UE state data may include an indication that the UE 102 is associated with a low power mode, an amount of power in a battery associated with the UE 102, a charge state indication associated with the UE 102, an application associated with the UE 102, and/or a temperature associated with the UE 102.

Additional conditions and/or parameters that may be considered for determining CDRX parameters include, but are not limited to, one or more of frequency resources available (e.g., low-band, mid-band, high-band), radio access technologies available (e.g., 4G, 5G, etc.), whether carrier aggregation is available, subscriber level, data history (e.g., an amount of downlink data used over a time period with respect to a threshold), and the like Once the CDRX parameters are determined, the base station 108 may send the CDRX parameters to a CDRX component 120 of the UE 102 via a communication link 122. For example, the base station 108 may utilize a media access control (MAC) layer of the base station 108 to communicate with a MAC layer of the UE 102 and provide the CDRX parameters. By utilizing the MAC layer to provide the CDRX parameters, the base station 108 may update CDRX parameters more frequently without having to send an RRC message to the UE 102, thereby decreasing the potential for dropped calls. In some examples, once the CDRX parameters are sent to the UE 102 and the UE 102 is operating in accordance with the CDRX parameters, the base station 108 may send the downlink data 112 to the UE 102.

In some examples, once the CDRX parameters are determined, the base station 108 may assign data packets to a transmission buffer associated with a Packet Data Convergence Protocol (PDCP) layer based on the CDRX parameters. The UE 102 may access the PDCP layer to determine adjustments to the CDRX parameters. In some examples, the MAC layer of the base station may provide an indication of CDRX parameters to the PDCP layer for data routing, as discussed herein.

In some cases, the UE 102 can connect to one base station using a Fifth Generation (5G) New Radio (NR) connection and also connect to another base station using a Fourth Generation (4G) Long-Term Evolution (LTE) connection. This type of dual connection can be referred to as an E-UTRAN New Radio-Dual Connectivity (EN-DC) connection. In some cases, the CDRX component 114 may instruct the CDRX component 120 to apply different CDRX parameters based on the type of base station that the UE 102 is communicating with. For example, the CDRX component 114 may instruct the CDRX component 120 to apply a first set of CDRX parameters when the UE 102 is communicating with a 5G NR base station and to apply a second set of CDRX parameters when the UE 102 is communicating with an LTE base station.

Dynamically adapting CDRX parameters for the UE 102 based on the type of traffic included in the downlink data 112 (as well as other types of data), enables the UE 102 to conserve power by efficiently adjusting sleep cycles and being connected to the base station 108. In one example, the base station 108 may determine that an RSSI associated with the UE 102 is below or above a threshold amount. In some cases, if the RSSI associated with the UE 102 is below the threshold amount, the CDRX component 114 may decrease an inactivity time included in the CDRX parameters and increase an on-duration time included in the CDRX parameters. In some cases, if the RSSI associated with the UE 102 is above the threshold amount, the CDRX component 114 may increase an inactivity time included in the CDRX parameters and decrease an on-duration time included in the CDRX parameters. Applying CDRX parameters based on RSSI data this way enables the UE 102 to be more active when signal strength is strong and less active when signal strength is weak.

In some examples, the CDRX component 114 can receive data about the UE, downlink data, radio frequency conditions, network condition, and the like, and can input the data into a machine learned model to determine adjusted CDRX parameters for the UE 102 to use to optimize an operation of the UE 102 and/or of the network in general. Additional details are discussed below in connection with FIG. 2, as well as throughout this disclosure.

Figure 2:
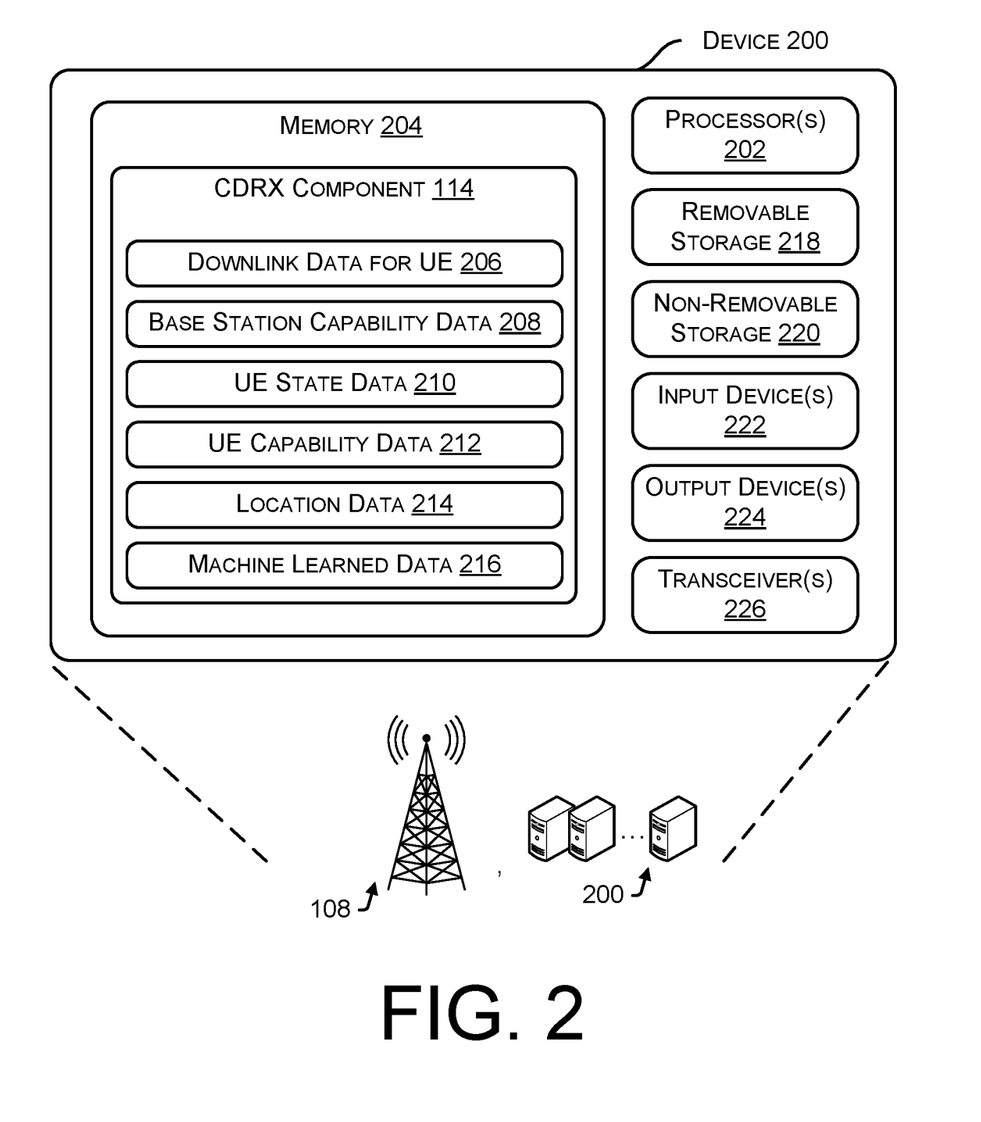
FIG. 2 is a block diagram of a device including a CDRX component.

FIG. 2 is a block diagram of a device 200 including a CDRX component. In some examples, the device 200 can be configured to implement the techniques discussed herein.

FIG. 2 shows only basic, high-level components of the device 200. Generally, the device 200 may comprise and/or may be implemented in any of various network components discussed herein, including those components illustrated in FIG. 1. For example, the device 200 may be implemented in the base station 108, which may include an eNB, a gNB, the core network 106, or other network device.

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include the CDRX component 114, which may include downlink data for UE 206, base station capability data 208, UE state data 210, UE capability data 212, location data 214, and/or machine learned data 216. In some cases, the CDRX component 114 may be implemented in a MAC layer of the device 200.

In some examples, the CDRX component 114 can include functionality to determine CDRX parameters for a UE, such as the UE 102, to utilize based on a traffic type associated with downlink data to be sent to the UE and/or conditions associated with the UE. The CDRX component 114 can use the data illustrated in FIG. 2 to receive information from the UE 102, the computing device 110, and/or the core network 106, determine CDRX parameters for the UE 102 to utilize based on the information, and send an indication to the UE 102 causing the UE 102 to operate using the CDRX parameters. For example, the CDRX component 114 can adjust CDRX parameters based at least in part on the downlink data for UE 206, the base station capability data 208, the UE state data 210, the UE capability data 212, the location data 214, and/or the machine learned data 216.

In some examples, the downlink data for UE 206 can include data received by another UE, data received by the computing device 110, and/or data received by the core network 106 that is intended to be transmitted to the UE 102. The downlink data for UE 206 can include data stored in a transmit buffer associated with the device 200. In some examples, the downlink data for UE 206 can represent an amount of data to be transmitted to the UE 102 in a next transmission time interval (TTI) associated with an LTE connection and/or a 5G connection. In some examples, the downlink data for UE 206 can include metadata such as a type of data (e.g., voice, video, data, gaming, TCP, UDP, etc.). The downlink data for the UE 206 may be used to determine adjusted CDRX parameters to be applied to the UE. In some examples, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc.

In some examples, the base station capability data 208 can be based at least in part on signal data associated with a connection between the device 200 (e.g., a connection associate with the downlink data for UE 206) and a UE (e.g., the UE 102). For example, the base station capability data 208 (also referred to as capability data 208) can be based at least in part on signal data comprising one or more of Channel Quality Information (CQI) data, signal-to-noise ratio (SNR) data, signal-to-interference plus noise ratio (SINR) data, and/or signal-to-noise plus distortion ratio (SNDR) data.

By way of example, and without limitation, a low RSSI may indicate that a UE is near a cell edge and may have a relatively low signal strength. In some examples, the CDRX parameters may be adjusted to decrease a sleep time (or adjust other parameters) to allow for additional data to be sent to the UE. Similarly, as the UE moves closer to the device 200 and RSSI increases, the sleep time may be increased because more data may be transmitted within the same transmission time period.

The base station capability data 208 can also be based at least in part on an amount of traffic and/or congestion at the device 200 or associated with an LTE and/or NR connection. For example, as a number of devices and/or connections between the device 200 and other UEs increases, an amount of resources to be allocated to a UE may decrease. In some examples, an amount of resources may be based at least in part on subscriber level, device type, location, and the like. Accordingly, the base station capability data 208 can be based on a number of factors or data, as discussed herein.

By way of example and without limitation, if a congestion level at the device 200 is above a threshold value the device 200 may adjust CDRX parameters for one or more UEs connected to the device 200 to increase a sleep time (or adjust other parameters). In some examples, sleep time can be adjusted for different UEs based on traffic type, subscriber level, UE state(s), and the like, as discussed herein.

In some examples, the UE state data 210 can include data received from the UE representing one or more conditions at the UE. In some examples, the UE state data 210 can be received from the UE state component 118 of the reporting component 116. In some examples, the UE state data 210 can represent data about a display status of the UE, sensor data from the UE, an application type associated with the UE, an indication that the UE is associated with a low power mode, an amount of power in a battery associated with the UE, a charge state indication associated with the UE, as well as other factors.

In some examples, the UE state data 210 can include an indication that the UE is associated with a low power mode. For example, a UE may automatically enter a low-power state after a period of inactivity or based on a charge status. In some examples, a UE may enter a low-power state based on a user preference. In any event, the CDRX component 114 can determine how to adjust CDRX parameters based at least in part on an indication of whether the UE is associated with a low power state.

Similarly, the CDRX component 114 can receive an indication of an amount of power in a battery associated with the UE. In some examples, the indication of an amount of power can be represented as a scalar value, as a percentage, as an amount of time until the UE battery is depleted based on current or estimated usage, and the like. The CDRX component 114 can determine how to adjust CDRX parameters based at least in part on an indication of the amount of power in a battery associated with the UE. For example, the CDRX component 114 may adjust CDRX parameters based on whether the power in a battery associated with the UE is above or below a threshold. In some cases, if the power level is below the threshold, the CDRX component 114 may increase an inactivity time included in the CDRX parameters and decrease an on-duration time included in the CDRX parameters. In some cases, if the power level is above the threshold, the CDRX component 114 may decrease an inactivity time included in the CDRX parameters and increase an on-duration time included in the CDRX parameters.

In some examples, a charge state indication associated with the UE can indicate whether the UE is currently being charged and/or an amount of time to a full battery or to a particular charge level. The CDRX component 114 can determine how to adjust CDRX parameters based at least in part an indication of the charge state of the UE.

In some cases, the UE state data 210 may include RSSI data associated with a UE, such as UE 102. For example, the CDRX component 114 may determine that the RSSI associated with the UE 102 is below a threshold amount and may decrease an inactivity time included in the CDRX parameters and increase an on-duration time included in the CDRX parameters. In some cases, if the RSSI associated with the UE 102 is above the threshold amount, the CDRX component 114 may increase an inactivity time included in the CDRX parameters and decrease an on-duration time included in the CDRX parameters. Applying CDRX parameters based on RSSI data this way enables the UE 102 to be more active when signal strength is strong and less active when signal strength is weak.

In some examples, the UE capability data 212 can include an indication of whether the UE supports an EN-DC connection, an LTE connection, and/or an NR connection. In some examples, the UE capability data 212 can include an indication of particular frequency bands that the UE supports so that the CDRX component 114 can determine how to adjust CDRX parameters in order to can optimize traffic between multiple devices. In some examples, the UE capability data 212 can indicate various modulation schemes (e.g., QAM schemes) supported by the UE, which may factor into the base station capability data 208, as discussed above.

In some examples, the location data 214 can include a location of the UE. For example, the location data 214 can be based on GPS data, base station triangulation data, and the like. In some examples, the location data 214 can include velocity data and heading data, which may be indicative of the UE being at one location for a period of time or on the move (e.g., in a vehicle). In some cases, the CDRX component 114 may utilize the location data 214 and/or radio signal timing advance (TA) estimation to determine a distance between the UE and the device 200. In some examples, the CDRX component 114 may adjust a CDRX parameter based at least in part on the distance being above or below threshold distance.

In some examples, the device 200 can estimate or otherwise determine a location associated with a UE in the environment based at least in part on radio signal TA data. In some examples, the device 200 can determine an amount of time associated with a signal propagating from the device 200 to the UE 102. The device 200 can receive timing advance data over time to estimate a position in the environment. In some examples, the device 200 can receive timing advance data from other base stations in the environment to triangulate or otherwise determine a location of the UE in the environment In some examples, the machine learned data 216 can include one or more machine learned models or heuristics that can be used to determine which CDRX parameters the UE should adjust. For example, the machine learned data 216 can include weight(s) for various factors that can be used to set threshold(s) or likelihoods and/or determine factors that increase or decrease threshold(s) or likelihoods, and by how much.

In some examples, a machine learned model can determine adjusted CDRX parameters for the UE to use based on a confidence level associated with a predicted outcome being above a threshold level (e.g., such that there is a likelihood above a threshold level that an adjusted CDRX parameter will improve a communication, reduce power consumption, etc.).

In some instances, the machine learned can determine a similarity score between UE state data (e.g., power condition(s), 4G/5G capability, carrier aggregation capability, location data, timing advance data, etc.), radio frequency conditions (e.g., transmission power headroom data associated with the UE 102, uplink signal-to-interference-plus-noise ratio (SINR) data as determined by the base station 108, uplink path loss data determined by the base station 108, etc.), network conditions (e.g., load levels, congestions, radio access technologies (e.g., 4G/5G), downlink data information (e.g., voice traffic, video traffic, data traffic, etc.) and the like and ground truth conditions representing various conditions and outcomes. Based on a similarity score of input data associated with positive outcomes (e.g., instructing the UE to use an adjusted CDRX parameter resulting in a good quality of service, reduced or optimal power consumption, etc.) or negative outcomes, the machine learned model can instruct the UE to use a particular CDRX parameter.

In some examples, the machine learned data 216 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the machine learned model can determine traffic characteristics such as packet frequency data and/or packet size data to adjust CDRX parameters to optimize the CDRX parameters for the determined traffic characteristics. For example, the machine learned model can determine a sleep time (or other parameter) based on expected arrival times for various voice or data traffic.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. The memory 204, the removable storage 218 and the non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 218, and/or the non-removable storage 220 may in some cases include storage media used to transfer or distribute instructions, applications, and/or data. In some cases, the memory 204, the removable storage 218, and/or the non-removable storage 220 may include data storage that is accessed remotely, such as network-attached storage that the device 200 accesses over some type of data communications network.

In various examples, any or all of the memory 204, the removable storage 218, and/or the non-removable storage 220 may store programming instructions that, when executed, implement some or all of the function functionality described herein.

The device 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the device 200 also includes one or more wired or wireless transceiver(s) 226. For example, the transceiver(s) 226 can include a network interface card (NIC), a network adapter, a LAN adapter, or a physical, virtual, or logical address to connect to various networks, devices, or components illustrated in figures herein. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMAX, Bluetooth, infrared communication, and the like.

In some examples, the device 200 can be implemented as the UE 102 including the battery 104 and/or the reporting component 116.

Figure 3:
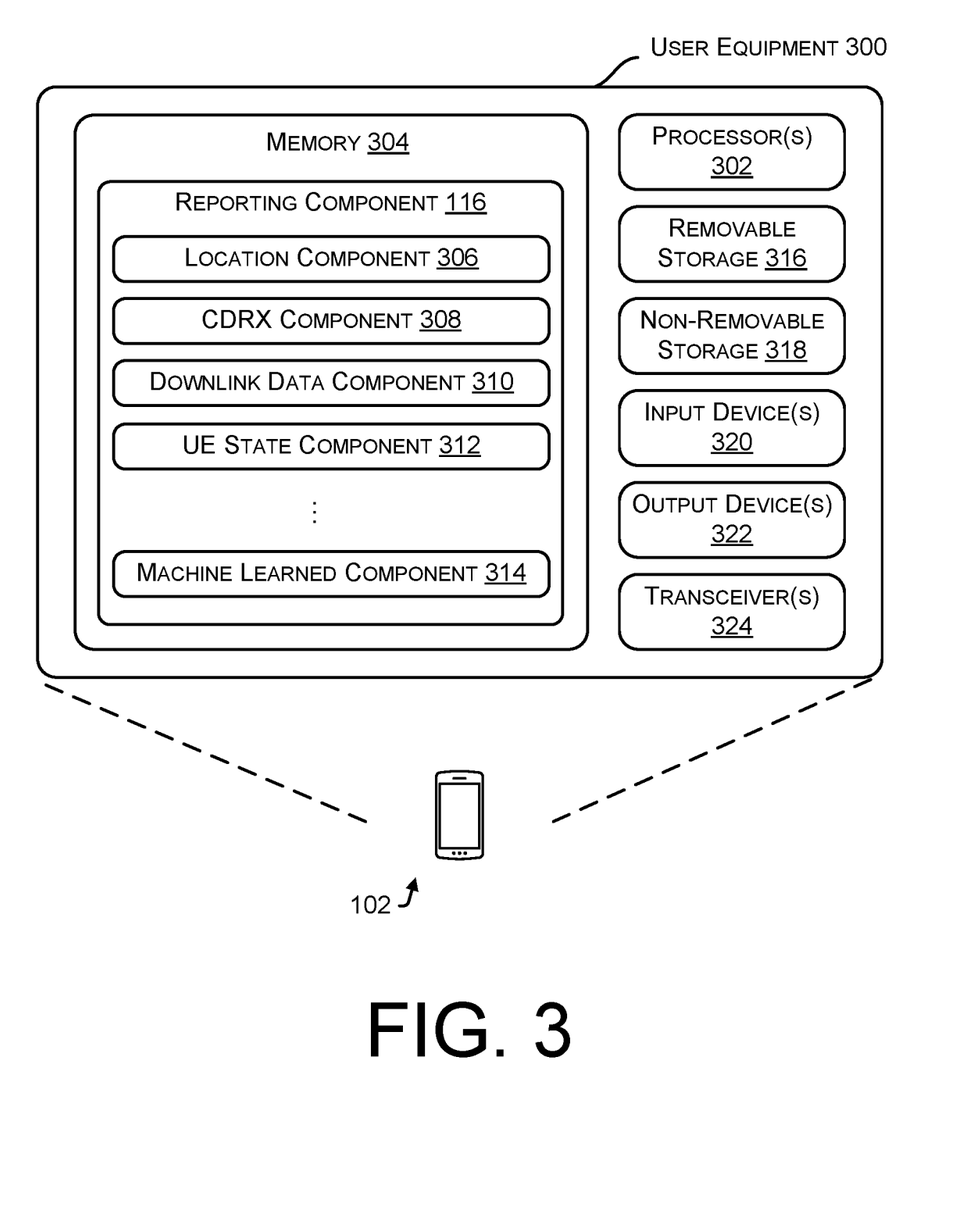
FIG. 3 a block diagram of a device including a reporting component.

FIG. 3 is a block diagram of a UE 300 including components for determining attributes for utilizing particular CDRX parameters. In some examples, the UE 300 (also referred to as a device 300) can be configured to implement some or all of the techniques discussed herein.

FIG. 3 shows basic, high-level components of the device 300. Generally, the device 300 may comprise and/or may be implemented in any of various network components discussed herein, including those components illustrated in FIG. 1.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include the reporting component 116, which may include a location component 306, a CDRX component 308, a downlink data component 310, and/or a UE state component 312, and a machine learned component 314.

In some examples, the reporting component 116 can include functionality to gather or otherwise determine data about the UE and to report the data to another computing device (e.g., the base station 108).

In further examples, the reporting component 116 can determine and report a user ID (identifier) that can indicate or correspond to a customer or user profile, such as an individual or organization using the device 300 or to whom the device 300 belongs. As another example, a user ID may indicate or correspond to a particular customer account with which the device 300 is associated. As yet another example, a user ID may indicate or correspond to a provider of services with which a data packet is associated.

In some examples, the location component 306 may be used to determine location data (e.g., a location) associated with the UE 300 and provide the location data to a computing device, such as the base station 108.

In some examples, the CDRX component 308 may be used to determine CDRX data associated with the UE 300 and provide the CDRX data to a computing device, such as the base station 108. The CDRX data may include data indicating which CDRX parameters are currently being used and/or which CDRX parameters have previously been used. In some cases, the CDRX component 308 may cause the UE 300 to switch CDRX parameters. For example, the reporting component 116 and/or the CDRX component 308 may operate in a MAC level of the UE 300 (in contrast to operating at an RRC reconfiguration level) and may receive CDRX parameters from the CDRX component 114 that operates in a MAC level of the base station 108 and/or the computing device 200. By communicating the CDRX parameters via the MAC level of the base station 108 and/or the computing device 200 and the MAC level of the UE 300 and/or UE 102, the CDRX parameters may be update more frequently without having to send an RRC message to the UE 300 and/or UE 102, thereby decreasing the potential for dropped calls. In some examples, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc.

In some examples, the downlink data component 310 may be used to receive downlink data, such as downlink data 112, from the base station 108 and/or the device 300. In some cases, the downlink data 112 may include video traffic, voice traffic, data traffic, etc.

In some examples, the UE state component 312 can include data representing one or more conditions at the UE.

In some examples, the UE state component 312 can represent data about a display status of the UE, sensor data from the UE, an indication that the UE is associated with a low power mode, an amount of power in a battery associated with the UE, a charge state indication associated with the UE, an application associated with the UE, a temperature associated with the UE, as well as other factors. The UE state component 312 can be input or otherwise provided to the machine learned component 314 (or another model or machine learned component discussed herein) to determine a priority level associated with a data request.

In some examples, the machine learned component 314 can include one or more machine learned models or heuristics that can be used to determine a priority level of downlink data associated with a data request. For example, the machine learned component 314 can include weight(s) for various factors that can be used to set priority level(s) or likelihoods and/or determine factors that increase or decrease a priority level, and by how much.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory, and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 2 by removable storage 316 and non-removable storage 318. Tangible computer-readable media can include volatile and non-volatile, removable and non-removable media implemented in any method or technology for storage of information, such as computer readable instructions, data structures, program modules, or other data. The memory 304, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 316, and/or the non-removable storage 318 may in some cases include storage media used to transfer or distribute instructions, applications, and/or data. In some cases, the memory 304, the removable storage 316, and/or the non-removable storage 318 may include data storage that is accessed remotely, such as network-attached storage that the device 300 accesses over some type of data communications network.

In various examples, any or all of the memory 304, the removable storage 316, and/or the non-removable storage 318 may store programming instructions that, when executed, implement some or all of the function functionality described herein.

The device 300 also can include input device(s) 320, such as a keypad, a cursor control, a touch-sensitive display, voice input device, etc., and output device(s) 322 such as a display, speakers, printers, etc. These devices are well known in the art and need not be discussed at length here.

As illustrated in FIG. 3, the device 300 also includes one or more wired or wireless transceiver(s) 324. For example, the transceiver(s) 324 can include a network interface card (NIC), a network adapter, a LAN adapter, or a physical, virtual, or logical address to connect to various networks, devices, or components illustrated in figures herein. To increase throughput when exchanging wireless data, the transceiver(s) 324 can utilize multiple-input/multiple-output (MIMO) technology. The transceiver(s) 324 can comprise any sort of wireless transceivers capable of engaging in wireless, radio frequency (RF) communication. The transceiver(s) 324 can also include other wireless modems, such as a modem for engaging in Wi-Fi, WiMAX, Bluetooth, infrared communication, and the like.

FIGS. 4-7 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

Figure 4:
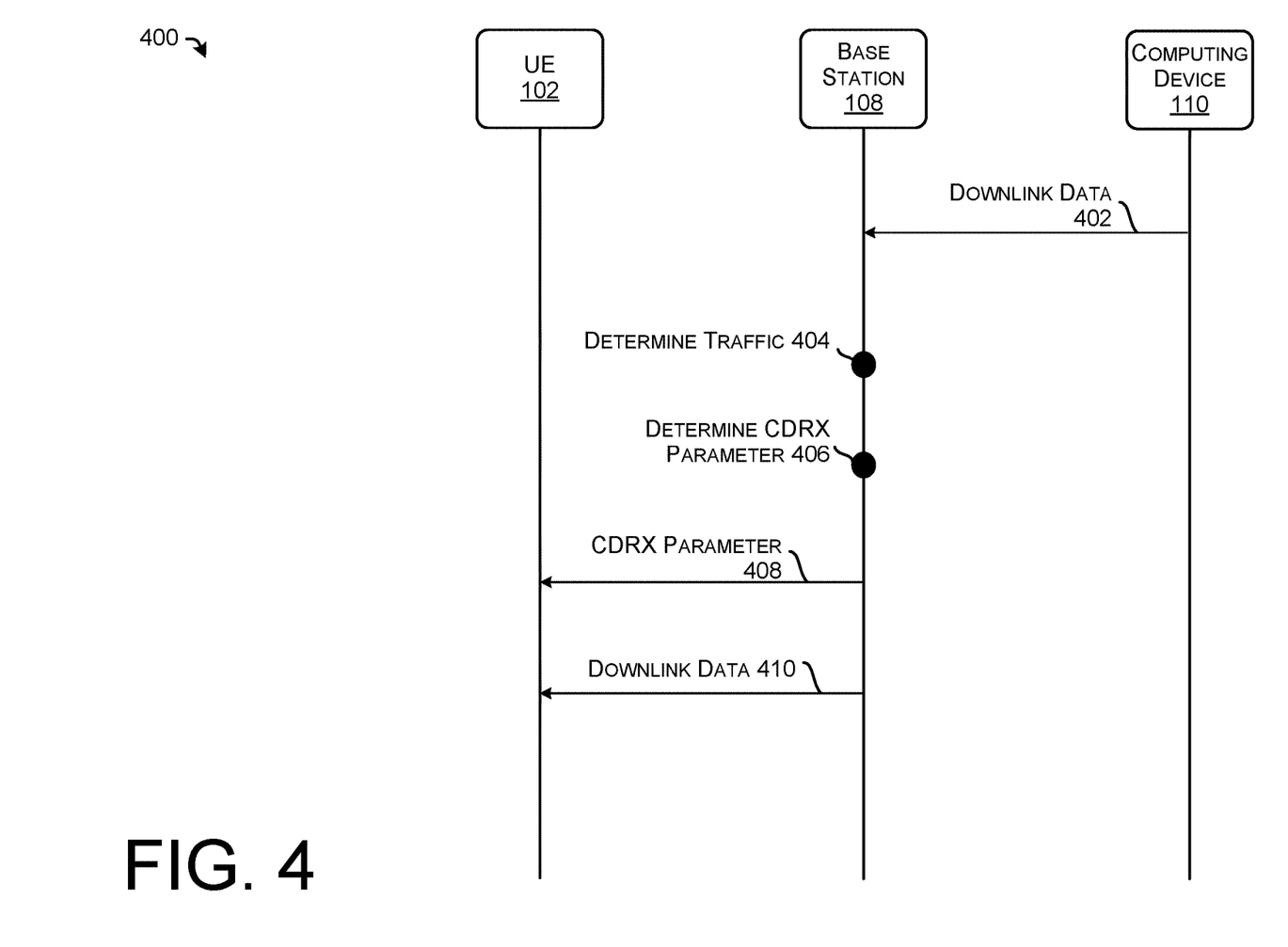
FIG. 4 shows a sequence diagram of example operations and messages a base station can use to dynamically adjust CDRX parameters.

FIG. 4 shows a sequence diagram 400 of example operations and messages a base station can use to determine CDRX parameters to be used by a UE.

At point 402, the base station 108 may receive downlink data from the computing device 110. For Example, the base station 108 may receive downlink data 112 from the computing device 110 and/or the core network 106 that is intended to be transmitted to the UE 102. The downlink data 112 can include data stored in a transmit buffer associated with the base station 108. In some examples, the downlink data 112 can represent an amount of data to be transmitted to the UE 102 in a next transmission time interval (TTI) associated with an LTE connection and/or a 5G connection. In some examples, the downlink data 112 can include metadata such as a type of data (e.g., voice, video, data, gaming, TCP, UDP, etc.).

At point 404, the base station 108 may determine a traffic classification associated with the downlink data. For example, the base station 108 may determine that the downlink data 112 is associated with at least one of voice traffic, video traffic, data traffic, etc.

At point 406, the base station 108 may determine a CDRX parameter based at least in part on the traffic classification. For example, once the traffic classification is determined, a CDRX component 114 of the base station 108 may determine CDRX parameters that should be applied to the UE 102 based on the traffic classification. For example, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc. The CDRX component 114 of the base station 108 may adjust any of and/or all of the CDRX parameters based on the traffic classification of the downlink data 112 in order to improve the efficiency (e.g., to conserve power) of the UE 102.

At point 408 the base station 108 may send the CDRX parameters to the UE 102. For example, once the CDRX parameters are determined, the base station 108 may send the CDRX parameters to a CDRX component 120 of the UE 102 via a communication link 122. For example, the base station 108 may utilize a media access control (MAC) layer of the base station 108 to communicate with a MAC layer of the UE 102 and provide the CDRX parameters. By utilizing the MAC layer to provide the CDRX parameters, the base station 108 may update CDRX parameters more frequently without having to send an RRC message to the UE 102, thereby decreasing the potential for dropped calls. In some examples, once the CDRX parameters are determined, the base station 108 may assign data packets to a transmission buffer associated with a Packet Data Convergence Protocol (PDCP) layer based on the CDRX parameters. The UE 102 may access the PDCP layer to determine adjustments to the CDRX parameters.

At point 410 the base station 108 may send the downlink data to the UE 102. For example, once the CDRX parameters are sent to the UE 102 and the UE 102 is operating in accordance with the CDRX parameters, the base station 108 may send the downlink data 112 to the UE 102.

Figure 5:
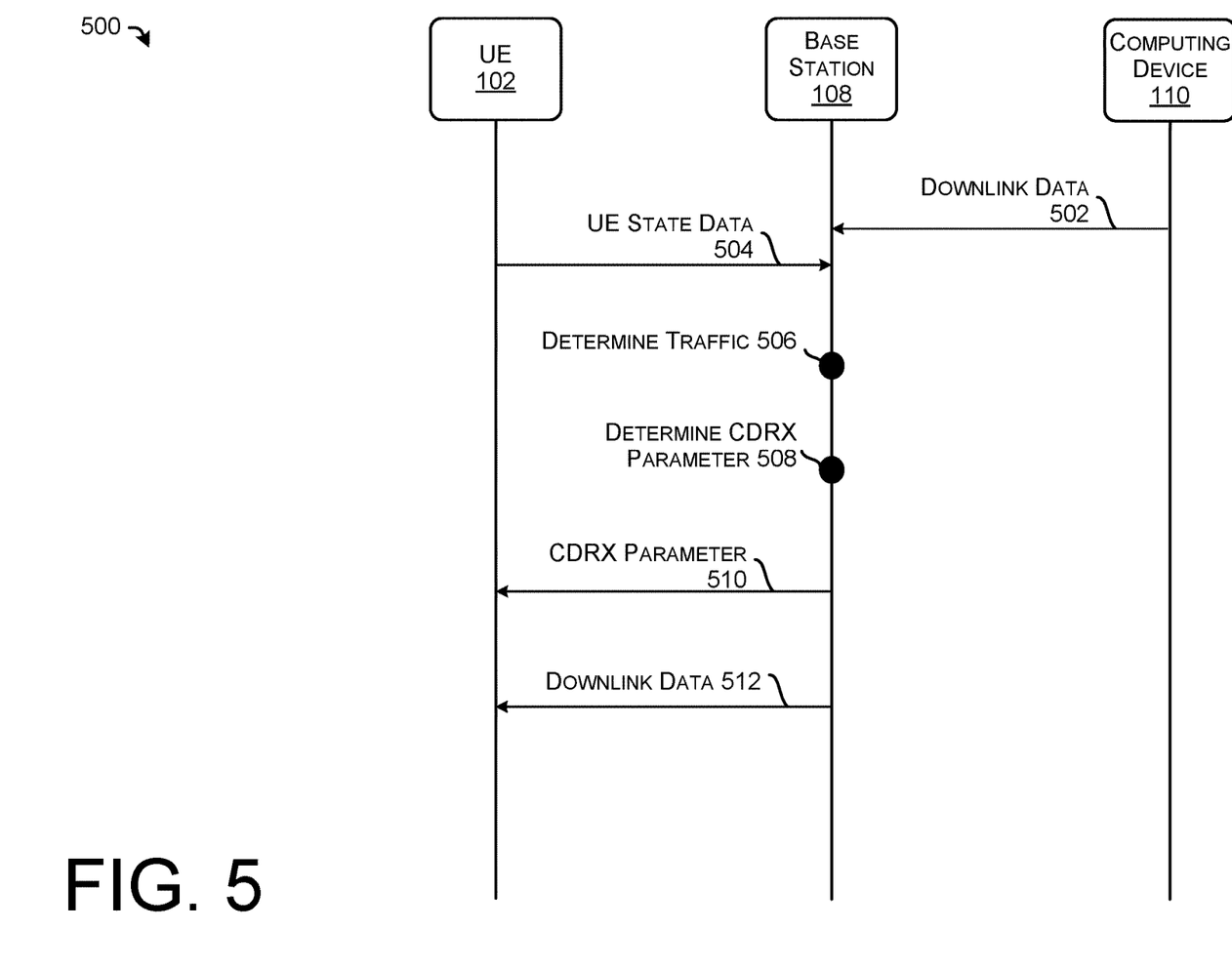
FIG. 5 another sequence diagram of example operations and messages a base station can use to dynamically adjust CDRX parameters.

FIG. 5 shows a sequence diagram 500 of another example operations and messages a base station can use to determine CDRX parameters to be used by a UE.

At point 502, the base station 108 may receive downlink data from the computing device 110. For Example, the base station 108 may receive downlink data 112 from the computing device 110 and/or the core network 106 that is intended to be transmitted to the UE 102. The downlink data 112 can include data stored in a transmit buffer associated with the base station 108. In some examples, the downlink data 112 can represent an amount of data to be transmitted to the UE 102 in a next transmission time interval (TTI) associated with an LTE connection and/or a 5G connection. In some examples, the downlink data 112 can include metadata such as a type of data (e.g., voice, video, data, gaming, TCP, UDP, etc.).

At point 504, the base station 108 may receive UE state data from the UE 102. For example, the UE 102 may send data representing one or more conditions at the UE via the UE state component 312. In some examples, the UE state component 312 can represent data about a display status of the UE, sensor data from the UE, an indication that the UE is associated with a low power mode, an amount of power in a battery associated with the UE, a charge state indication associated with the UE, an application associated with the UE, a temperature associated with the UE, as well as other factors. The UE state component 312 can be input or otherwise provided to the machine learned component 314

(or another model or machine learned component discussed herein) to determine a priority level associated with a data request.

At point 506, the base station 108 may determine a traffic classification associated with the downlink data. For example, the base station 108 may determine that the downlink data 112 is associated with at least one of voice traffic, video traffic, data traffic, etc.

At point 508, the base station 108 may determine a CDRX parameter based at least in part on the traffic classification. For example, once the traffic classification is determined, a CDRX component 114 of the base station 108 may determine CDRX parameters that should be applied to the UE 102 based on the traffic classification. For example, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc. The CDRX component 114 of the base station 108 may adjust any of and/or all of the CDRX parameters based on the traffic classification of the downlink data 112 in order to improve the efficiency (e.g., to conserve power) of the UE 102 while maintaining a quality of service and/or a quality of user experience at the UE 102.

In some examples, the CDRX component 114 of the base station 108 may determine CDRX parameters based on other types of information, such as but not limited to, UE state data received from a reporting component 116 that reports data from a UE state component 118, RSSI data associated with the UE 102, a size of the downlink data 112, and/or a congestion level associated with the base station 108. In some cases, the UE state data may include an indication that the UE 102 is associated with a low power mode, an amount of power in a battery associated with the UE 102, a charge state indication associated with the UE 102, an application associated with the UE 102, and/or a temperature associated with the UE 102.

At point 510 the base station 108 may send the CDRX parameters to the UE 102. For example, once the CDRX parameters are determined, the base station 108 may send the CDRX parameters to a CDRX component 120 of the UE 102 via a communication link 122. For example, the base station 108 may utilize a media access control (MAC) layer of the base station 108 to communicate with a MAC layer of the UE 102 and provide the CDRX parameters. By utilizing the MAC layer to provide the CDRX parameters, the base station 108 may update CDRX parameters more frequently without having to send an RRC message to the UE 102, thereby decreasing the potential for dropped calls.

At point 512 the base station 108 may send the downlink data to the UE 102. For example, once the CDRX parameters are sent to the UE 102 and the UE 102 is operating in accordance with the CDRX parameters, the base station 108 may send the downlink data 112 to the UE 102.

Figure 6:
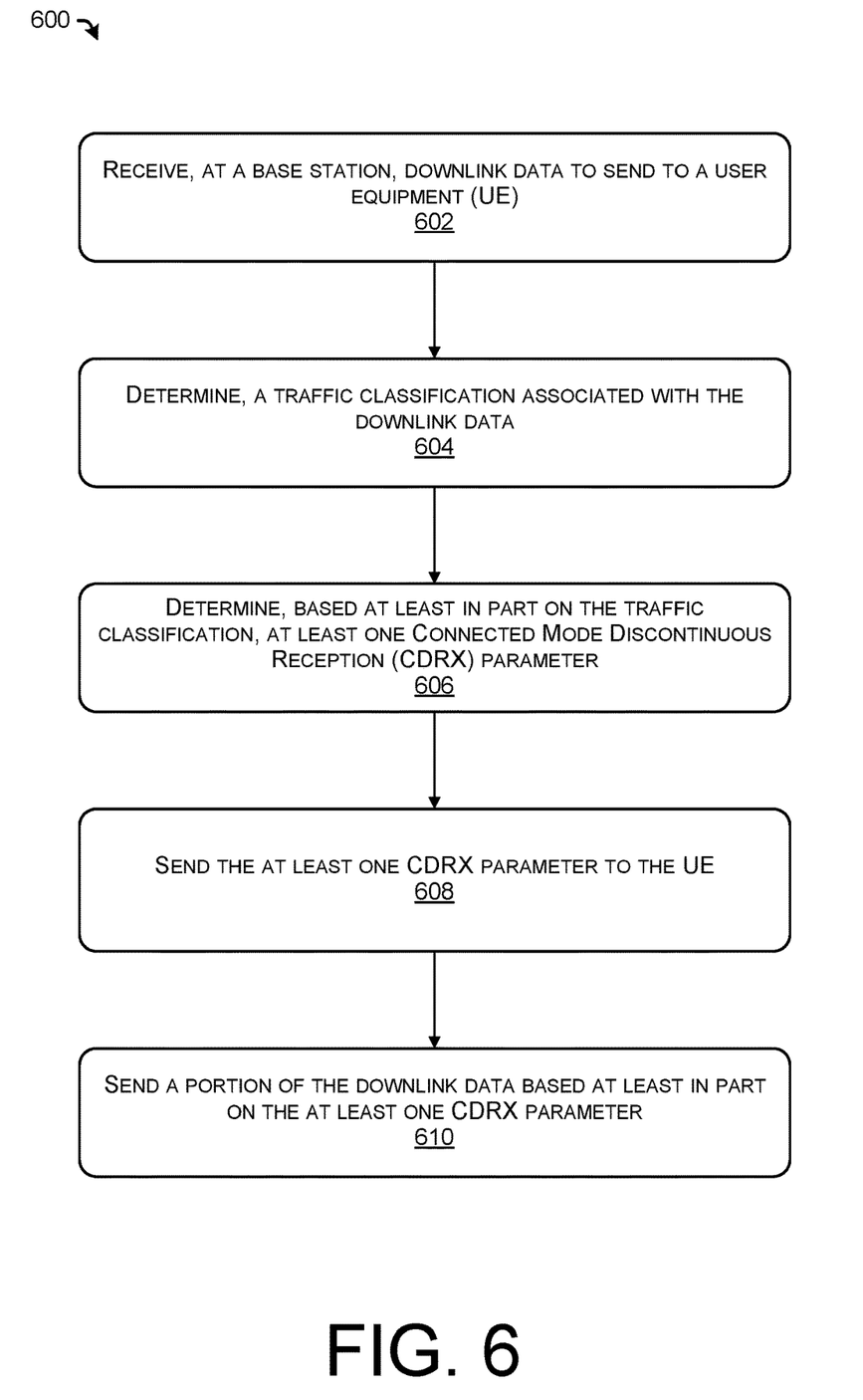
FIG. 6 illustrates an example process for dynamically adjusting CDRX parameters.

FIG. 6 illustrates example process for determining CDRX parameters. The example process 600 can be performed by the base station 108 and/or by the device 200 comprising the CDRX component 114, or another component or device as discussed herein.

At operation 602, the process can include receiving, at a base station, downlink data to send to a user equipment (UE). For example, the base station 108 may receive downlink data 112 from the computing device 110 and/or the core network 106 that is intended to be transmitted to the UE 102. The downlink data 112 can include data stored in a transmit buffer associated with the base station 108. In some examples, the downlink data 112 can represent an amount of data to be transmitted to the UE 102 in a next transmission time interval (TTI) associated with an LTE connection and/or a 5G connection. In some examples, the downlink data 112 can include metadata such as a type of data (e.g., voice, video, data, gaming, TCP, UDP, etc.).

At operation 604, the process can include determining a traffic classification associated with the downlink data. For example, the base station 108 may determine that the downlink data 112 is associated with at least one of voice traffic, video traffic, data traffic, etc.

At operation 606, the process can include determining, based at least in part on the traffic classification, at least one Connected Mode Discontinuous Reception (CDRX) parameter. For example, once the traffic classification is determined, a CDRX component 114 of the base station 108 may determine CDRX parameters that should be applied to the UE 102 based on the traffic classification. For example, the CDRX parameters may include at least one of an indication to enable CDRX, an indication of a cycle time period, an indication of an on-duration time, an indication of an inactivity time, and indication of a retransmission time, an indication of a short discontinuous reception (DRX) cycle period, and indication of a short DRX cycle time, etc. The CDRX component 114 of the base station 108 may adjust any of and/or all of the CDRX parameters based on the traffic classification of the downlink data 112 in order to improve the efficiency (e.g., to conserve power) of the UE 102.

At operation 608, the process can include sending the at least one CDRX parameter to the UE. For example, once the CDRX parameters are determined, the base station 108 may send the CDRX parameters to a CDRX component 120 of the UE 102 via a communication link 122. For example, the base station 108 may utilize a media access control (MAC) layer of the base station 108 to communicate with a MAC layer of the UE 102 and provide the CDRX parameters. By utilizing the MAC layer to provide the CDRX parameters, the base station 108 may update CDRX parameters more frequently without having to send an RRC message to the UE 102, thereby decreasing the potential for dropped calls. Further, the use of the MAC layer to adjust CDRX parameters reduces signaling and latency in implementing the techniques discussed herein.

At operation 610, the process can include sending a portion of the downlink data based at least in part on the at least one CDRX parameter. For example, once the CDRX parameters are sent to the UE 102 and the UE 102 is operating in accordance with the CDRX parameters, the base station 108 may send the downlink data 112 to the UE 102.

Figure 7:
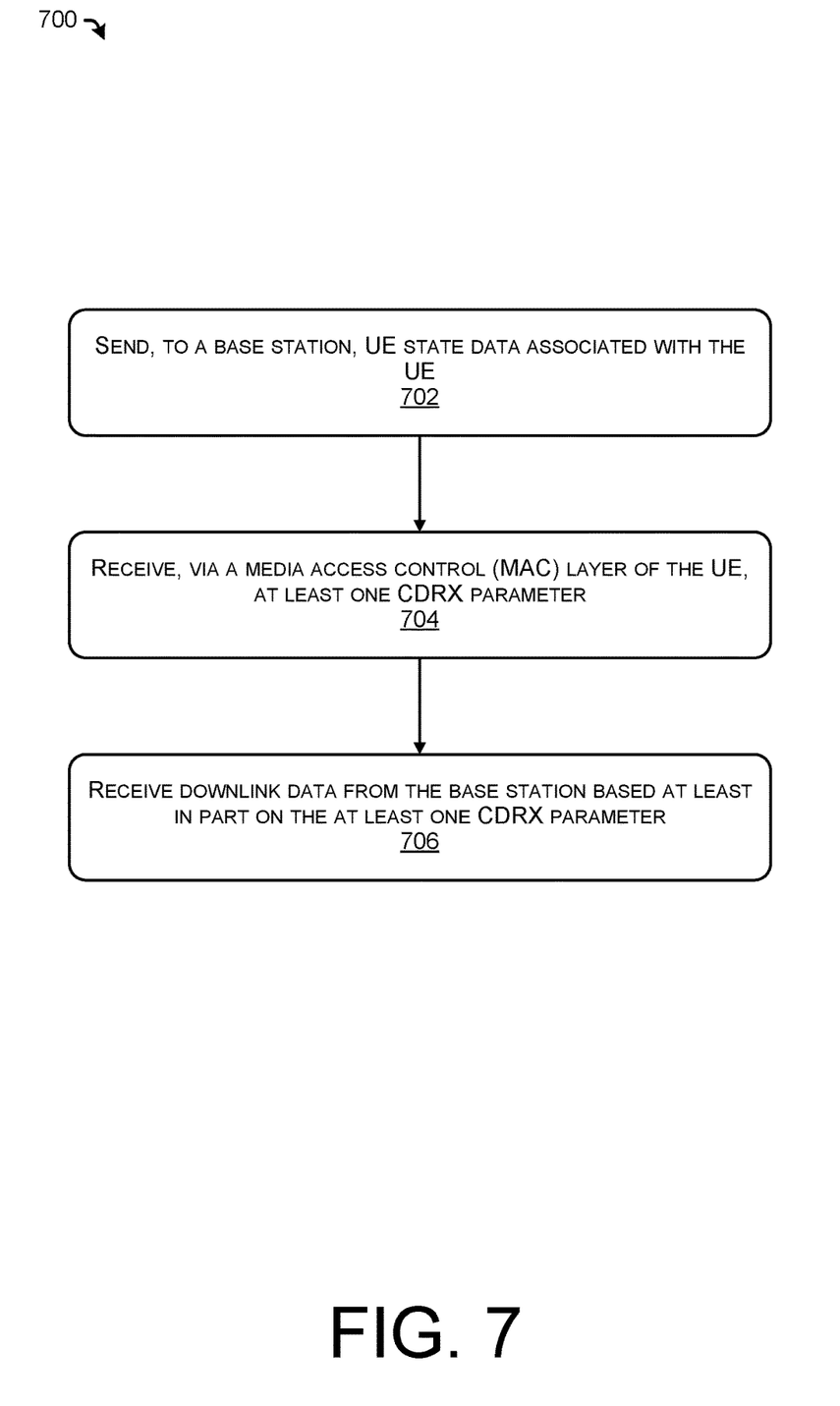
FIG. 7 illustrates another example process for dynamically adjusting CDRX parameters.

FIG. 7 illustrates another example process for dynamically adjusting CDRX parameters. The example process 700 can be performed by the UE 102 and/or by the device 300 comprising the reporting component 116, or another component or device as discussed herein.

At operation 702, the process can include sending, to a base station, UE state data associated with the UE. For example, the UE 102 may send data representing one or more conditions at the UE via the UE state component 312. In some examples, the UE state component 312 can represent data about a display status of the UE, sensor data from the UE, an indication that the UE is associated with a low power mode, an amount of power in a battery associated with the UE, a charge state indication associated with the UE, an application associated with the UE, a temperature associated with the UE, as well as other factors. The UE state component 312 can be input or otherwise provided to the machine learned component 314 (or another model or machine learned component discussed herein) to determine CDRX parameters associated with a data request.

At operation 704, the process can include receiving, via a media access control (MAC) layer of the UE, at least one CDRX parameter. For example, once the CDRX parameters are determined, the base station 108 may send the CDRX parameters to a CDRX component 120 of the UE 102 via a communication link 122. For example, the base station 108 may utilize a media access control (MAC) layer of the base station 108 to communicate with a MAC layer of the UE 102 and provide the CDRX parameters. By utilizing the MAC layer to provide the CDRX parameters, the base station 108 may update CDRX parameters more frequently without having to send an RRC message to the UE 102, thereby decreasing the potential for dropped calls.

At operation 706, the process can include receiving downlink data from the base station based at least in part on the at least one CDRX parameter. For example, once the CDRX parameters are sent to the UE 102 and the UE 102 is operating in accordance with the CDRX parameters, the base station 108 may send the downlink data 112 to the UE 102.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, at a base station, downlink data to send to a user equipment (UE);
   determining, based at least in part on a machine learned model, a traffic classification associated with the downlink data;
   determining, based at least in part on the traffic classification, at least one Connected Mode Discontinuous Reception (CDRX) parameter;
   sending the at least one CDRX parameter to the UE; and
   sending a portion of the downlink data based at least in part on the at least one CDRX parameter.

2. The method of claim 1, wherein the traffic classification comprises at least one of packet frequency data or packet size data.

3. The method of claim 1, wherein the at least one CDRX parameter comprises at least one of:
   a first indication to enable CDRX;
   a second indication of a cycle time period;
   a third indication of an on-duration time;
   a fourth indication of an inactivity time;
   a fifth indication of a retransmission time;
   a sixth indication of a short Discontinuous Reception (DRX) cycle period; or
   a seventh indication of a short DRX cycle time.

4. The method of claim 1, further comprising:
   receiving UE state data associated with the UE, the UE state data comprising at least one of:
   an indication that the UE is associated with a low power mode;
   an amount of power in a battery associated with the UE;
   a charge state indication associated with the UE;
   an application associated with the UE; or
   a temperature associated with the UE.

5. The method of claim 1, further comprising:
   determining Received Signal Strength Indicator (RSSI) data associated with the UE; and
   determining the at least one CDRX parameter further based at least in part on the RSSI data.

6. The method of claim 1, wherein the at least one CDRX parameter is sent via a Media Access Control (MAC) layer of the base station to a MAC layer of the UE.

7. The method of claim 6, wherein the at least one CDRX parameter is not sent in association with a Radio Resource Control (RRC) reconfiguration message.

8. The method of claim 1, wherein traffic classification comprises at least one of:
   voice traffic;
   video traffic; or
   data traffic.

9. The method of claim 1, further comprising:
   determining the at least one CDRX parameter further based at least in part on at least one of:
   a size of the downlink data;
   a congestion level associated with the base station;
   a dual connectivity state of the base station;
   a frequency band associated with a connection between the UE and the base station; or
   an availability of dual connectivity for a connection between the UE and the base station.

10. The method of claim 1, further comprising:
    assigning data packets to a transmission buffer associated with a Packet Data Convergence Protocol (PDCP) layer based at least in part on the at least one CDRX parameter.

11. A system comprising:
    one or more processors; and
    one or more non-transitory computer-readable media storing computer-executable instructions that, when executed, cause the one or more processors to perform operations comprising:
    receiving, at a base station, downlink data to send to a user equipment (UE);
    determining a traffic classification associated with the downlink data;
    determining, based at least in part on the traffic classification, at least one Connected Mode Discontinuous Reception (CDRX) parameter;
    sending the at least one CDRX parameter to the UE; and
    sending a portion of the downlink data based at least in part on the at least one CDRX parameter.

12. The system of claim 11, wherein the base station is a Fifth Generation (5G) base station.

13. The system of claim 11, wherein the at least one CDRX parameter comprises at least one of:
    a first indication to enable CDRX;
    a second indication of a cycle time period;
    a third indication of an on-duration time;
    a fourth indication of an inactivity time;
    a fifth indication of a retransmission time;
    a sixth indication of a short Discontinuous Reception (DRX) cycle period; or
    a seventh indication of a short DRX cycle time.

14. The system of claim 11, wherein the operations further comprise:
  receiving UE state data associated with the UE, the UE state data comprising at least one of:
  an indication that the UE is associated with a low power mode;
  an amount of power in a battery associated with the UE;
  a charge state indication associated with the UE;
  an application associated with the UE; or
  a temperature associated with the UE.

15. The system of claim 11, wherein the operations further comprise:
  determining Received Signal Strength Indicator (RSSI) data associated with the UE; and
  determining the at least one CDRX parameter further based at least in part on the RSSI data.

16. The system of claim 11, wherein the at least one CDRX parameter is sent via a Media Access Control (MAC) layer of the base station to a MAC layer of the UE.

17. A non-transitory computer-readable medium having stored thereon computer-executable instructions that, when executed, cause one or more processors to perform operations comprising:
  receiving, at a base station, downlink data to send to a user equipment (UE);
  determining a traffic classification associated with the downlink data;
  determining, based at least in part on the traffic classification, at least one Connected Mode Discontinuous Reception (CDRX) parameter;
  sending the at least one CDRX parameter to the UE; and
  sending a portion of the downlink data based at least in part on the at least one CDRX parameter.

18. The non-transitory computer-readable medium of claim 17, wherein the at least one CDRX parameter comprises at least one of:
  a first indication to enable CDRX;
  a second indication of a cycle time period;
  a third indication of an on-duration time;
  a fourth indication of an inactivity time;
  a fifth indication of a retransmission time;
  a sixth indication of a short Discontinuous Reception (DRX) cycle period; or
  a seventh indication of a short DRX cycle time.

19. The non-transitory computer-readable medium of claim 17, wherein the operations further comprise:
  receiving UE state data associated with the UE, the UE state data comprising at least one of:
  an indication that the UE is associated with a low power mode;
  an amount of power in a battery associated with the UE;
  a charge state indication associated with the UE;
  an application associated with the UE; or
  a temperature associated with the UE.

20. The non-transitory computer-readable medium of claim 17, wherein the at least one CDRX parameter is sent via a Media Access Control (MAC) layer of the base station to a MAC layer of the UE.

* * * * *